Figure 2:
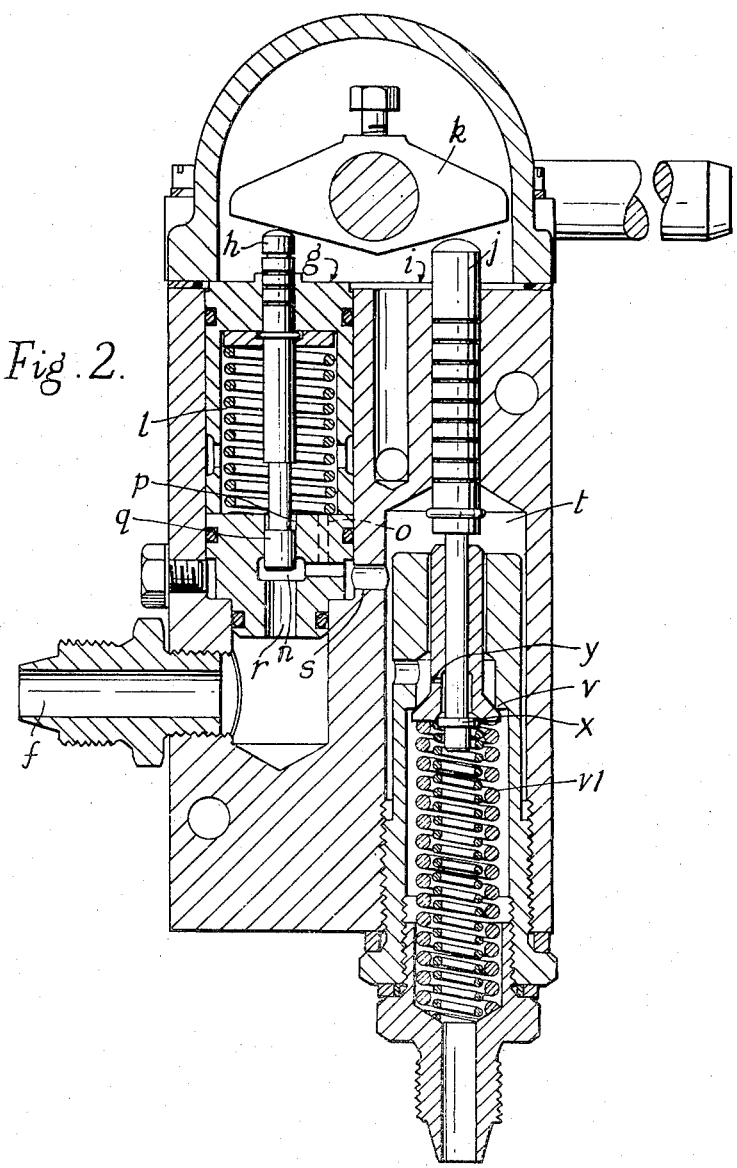

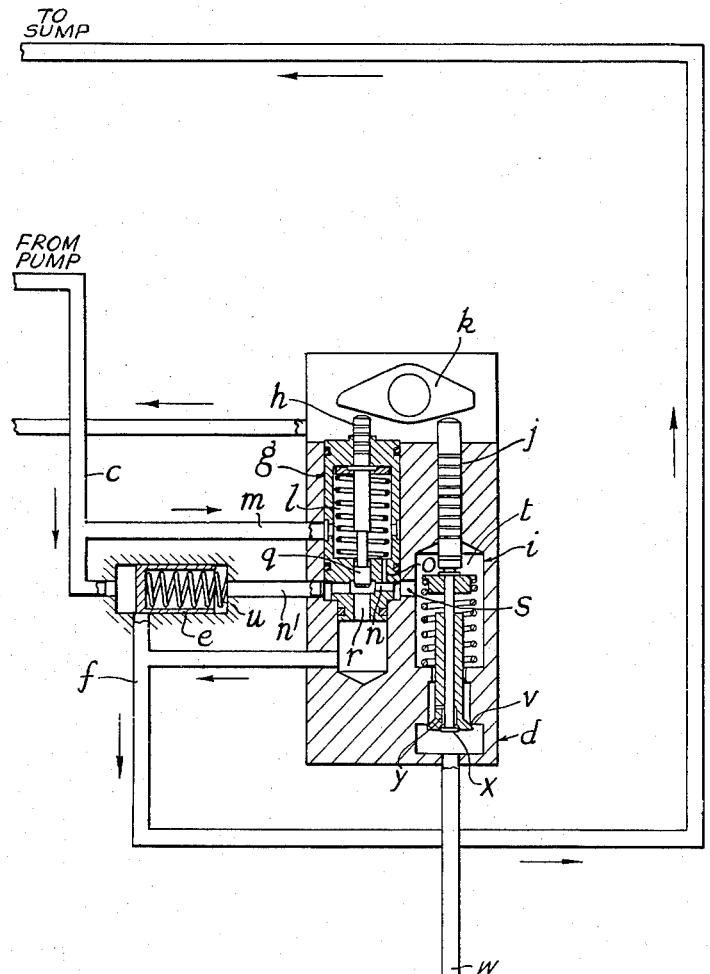
Fig. 1.
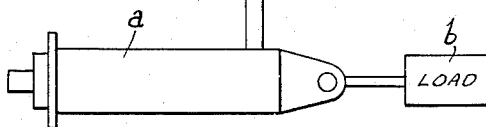

2,970,613

CONTINUOUSLY VARIABLE MECHANICAL TRANSMISSIONS

Frederick Baines, Swindon, England, assignor to The Plessey Company Limited, Ilford, England, a British company Filed Sept. 3, 1957, Ser. No. 681,866

Claims priority, application Great Britain Sept. 6, 1956

5 Claims. (Cl. 137—621)

This invention relates to mechanical power-transmission devices in which the transmission ratio is continuously variable. Such devices include more particularly V-pulley drives in which the two sides of one pulley can be moved towards and away from each other, the two sides of the other pulley being arranged to move relative to each other in the opposite direction.

The present invention has for an object to provide improved hydraulically operable actuating means for varying when required the transmission ratio for which the device is set.

According to the invention the means for variably setting the drive include a hydraulically operable piston element in conjunction with flow-control means adapted to supply operating fluid to said piston element selectively at one or other of at least two different rates. In the drawing accompanying the specification.

Figure 3:
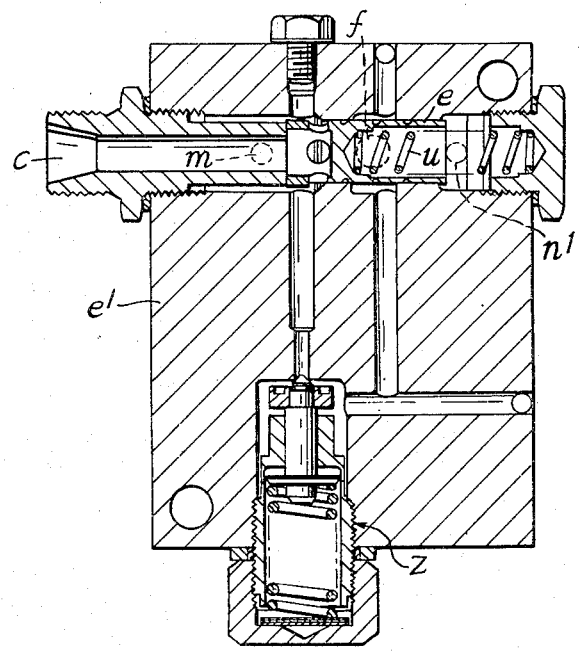

Fig. 1 is a flow diagram of one form of actuating means incorporating the invention and Fig. 2 is a sectional elevation of the main valve arrangement, while Fig. 3 is a sectional elevation of one form of spill valve device.

Referring now to the drawing, $a$ is a hydraulic cylinder operatively connected with the control member $b$ of a split-pulley drive or other transmission device having a continuously variable transmission ratio. The cylinder is operated by hydraulic fluid under pressure from a line $c$ under the control of a manually operable valve device $d$ and an automatic spill valve $e$, the outlet connection $f$ of which returns excess fluid to the sump.

The valve device $d$ includes an inlet-control unit $g$ having a valve spindle $h$, and an outlet-control unit $i$ having a valve spindle $j$, while a manually operable cam member $k$ is adapted to depress either one or the other of the two spindles, according to the direction of its actuation.

Valve $g$ contains a pressure chamber $l$ which communicates through a line $m$ with the fluid supply $c$, and a control chamber $n$ which communicates freely with the back of the control piston of spill valve $e$, and which is connected to the pressure chamber $l$ through a restricted passage $o$. A further, wider connection $p$ between the pressure chamber $l$ and the control chamber $n$ is controlled by a head $q$ of the valve spindle $h$, which is also adapted to enter and thereby close a wide spill port $r$ leading from the control chamber $n$ to the sump connection $f$. Finally the control chamber $n$ communicates through an unrestricted connection $s$ with a valve chamber $t$ provided in the outlet-control unit $i$. When cam $k$ is in its normal or neutral position as indicated, no pressure fluid will reach the chamber $t$, since any fluid entering the control chamber $n$ can return to the sump via the unrestricted open port $r$; at the same time the pump is virtually unloaded, apart from residual line pressure through the system. A small amount of movement of the cam $k$ in an anti-clockwise direction (as seen in the drawing) (slow-acceleration position) will cause the head $q$ to seal the spill port $r$ and thus to cut off the connection between the control chamber $n$ and the sump. The spill valve $e$ which is biased to the closed position by a spring $u$ and to which the pressure in control chamber $n$ is communicated through a passage $n'$, maintains a predetermined pressure difference between the chambers $l$ and $n$, and liquid will therefore flow at a constant rate, determined by this pressure difference, from chamber $l$ to chamber $n$ through the restricted passage $o$ and build up pressure in the control chamber $n$.

The second valve unit $i$ includes a non-return valve $v$ of large diameter which, when the force of a spring $v1$ is overcome, allows flow from valve chamber $t$ into pipe line $w$, leading to cylinder $a$, but does not normally allow flow to take place in the opposite direction.

When cam $k$ is in the slow-acceleration position, valve $v$ will open as soon as the pressure build-up in chamber $n$ is sufficient to overcome the force of the spring $v1$, and liquid will flow to cylinder $a$ at the slow rate determined by the restricted passage $o$ in conjunction with spill valve $e$. As a result the transmission ratio device $b$ will be increased gradually to produce slow acceleration of the vehicle or the like, equipped with the device.

If the cam $k$ is moved by a larger amount in the same direction (fast-acceleration position), the head $q$ of valve spindle $h$ will, after sealing port $r$, leave the passage $p$, thus making available to the liquid in chamber $l$ a substantially unrestricted passage to control chamber $n$. The result is much faster operation of the device $b$, and therefore rapid acceleration of the vehicle or the like. Return of cam $k$ to its normal position will again vent chamber $n$ to the sump, but no liquid will escape from cylinder $a$ due to the action of the non-return valve $v$. The vehicle will therefore continue to travel at the speed it has assumed. Reduction of the speed is obtained by turning the cam $k$ in the opposite (clockwise) direction. A small movement in this direction to the slow-deceleration position causes spindle $w$ of valve $i$ to open a release valve $x$, which is seated coaxially on non-return valve $v$, whereupon liquid can escape from cylinder $a$ through a restricted passage $y$ to chamber $t$ and, through chamber $n$ of valve unit $g$, to the sump, thus causing the controls of the transmission drive $b$ to move gradually towards the position corresponding to the lowest vehicle speed. A further movement of the cam in this direction leads to a fast-deceleration position, in which spindle $w$ also forces open the non-return valve $v$, thus opening a relatively unrestricted escape path for liquid from cylinder $a$, by-passing the restricted port $y$.

Fig. 3 shows a practical construction of the spill valve device, which also incorporates a safety relief valve $z$, together with the connection line $m$ leading to the valve device $e$. The relief valve is connected to the inlet junction $c$ and to the spill passage $f$ by passages formed inside the valve housing $e1$.

What we claim is:

1. A hydraulic flow control device for use with a positive-flow-source of pressure liquid, comprising a valve housing formed with a valve chamber, a valve inlet connected to said source, a working outlet connected to the valve chamber, and a low-pressure outlet connected to a point at low pressure, a restricted first connection and a second unrestricted connection between the inlet and valve chamber and an unrestricted spill connection between the valve chamber and low pressure outlet, an inlet-control valve member movable in said housing between a first position in which said second connection is closed and said first connection and spill connection are open, a second position in which said first connection is open and said second connection and spill connection are closed, and a third position in which first and second connections are open and said spill connection is closed, a spill passage leading from said source to a point at low pressure, and a spill control valve in said spill passage, said spill control valve comprising a valve element, a spring urging the valve element to a position closing the said spill passage, and a hydraulic piston means for actuating said valve element in conjunction with said spring, one operative surface of said piston means being connected to said source to receive pressure from said source tending to urge said valve towards the open position against the action of said spring, and an opposite surface of said piston means being connnected to the valve chamber and subjected to the pressure in the valve chamber to counteract pressure from said source so that the spill control valve will substantially limit pressure from said source to a value exceeding the pressure in the valve chamber to a fixed value determined by the pre-loading of said spring.

2. A control device as claimed in claim 1, further including a combined non-return and release-control valve, interposed between said valve chamber and working outlet and having an actuating element so arranged that in a first position of said actuating element liquid is free to flow from the valve chamber to the working outlet but is prevented from flowing in the opposite direction and when said actuating element is in a second position a first passage permitting a restricted flow in said opposite direction is open, and when said actuating element is in a third position a wider passage by-passing said first passage is open to permit relatively unrestricted flow from the working outlet to the valve chamber.

3. A device as claimed in claim 2, wherein separate metering restrictions are provided for controlling respectively the admission of hydraulic liquid from the inlet chamber to the valve chamber and its release from the working outlet to the valve chamber.

4. A device as claimed in claim 2, wherein movement of the actuating element from the position permitting restricted flow from the working outlet to the position permitting unrestricted flow by-passing said first passage is arranged to progressively open a passage for such by-pass flow.

5. A control valve device as claimed in claim 2, further including a main actuating member operatively coupled in such manner to the inlet-control valve member and to the actuating element of the combined non-return and release valve that when said main actuating member is in a central position liquid is free to pass from the valve chamber through the spill connection to the low-pressure outlet and flow from the working outlet of the valve chamber to said valve chamber is prevented by the non-return and release valve, and when the actuating member is moved to one side of the central position to a first working position, the valve chamber is cut off from the low-pressure outlet and a restricted flow of liquid is admitted from the source through the first connection to the valve chamber, and when the actuating member is moved further to the same side to a second working position a relatively unrestricted flow of liquid is admitted from the source to the valve chamber through the first and second connections, the valve chamber being still cut off from the low-pressure outlet, and when the actuating member is moved to a first release position at the other side of said central position the valve chamber communicates with the low-pressure outlet through the spill connection and said restricted passage is open to permit flow of liquid at a low rate from the working outlet to the valve chamber, and when the actuating member is moved further to said other side to a second release position said wider passage is open permitting flow of liquid at a higher rate from the working outlet to the valve chamber, the spill connection from the valve chamber to the low-pressure outlet being also open.

References Cited in the file of this patent

UNITED STATES PATENTS

| | | |
|---|---|---|
| 1,976,122 | Haas | Oct. 9, 1934 |
| 2,544,972 | Worthington | Mar. 13, 1951 |
| 2,726,680 | Baines | Dec. 13, 1955 |

FOREIGN PATENTS

| | | |
|---|---|---|
| 475,693 | Great Britain | Nov. 24, 1937 |